Dec. 5, 1933.  M. H. DAMERELL  1,938,216
INDICATING MACHINE
Filed June 1, 1931  14 Sheets-Sheet 3

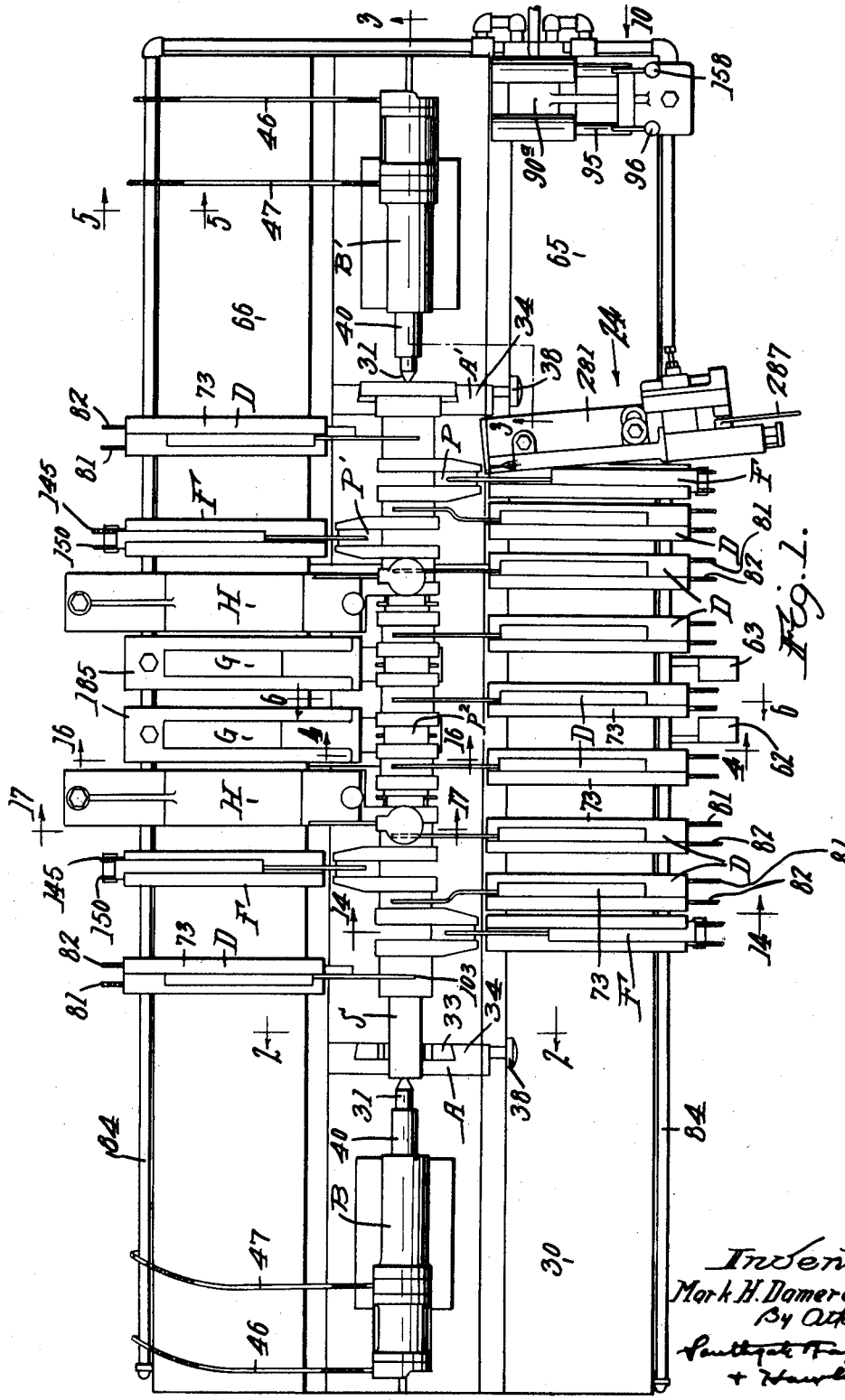

Inventor
Mark H. Damerell
By Attorneys

Dec. 5, 1933.  M. H. DAMERELL  1,938,216
INDICATING MACHINE
Filed June 1, 1931  14 Sheets-Sheet 4
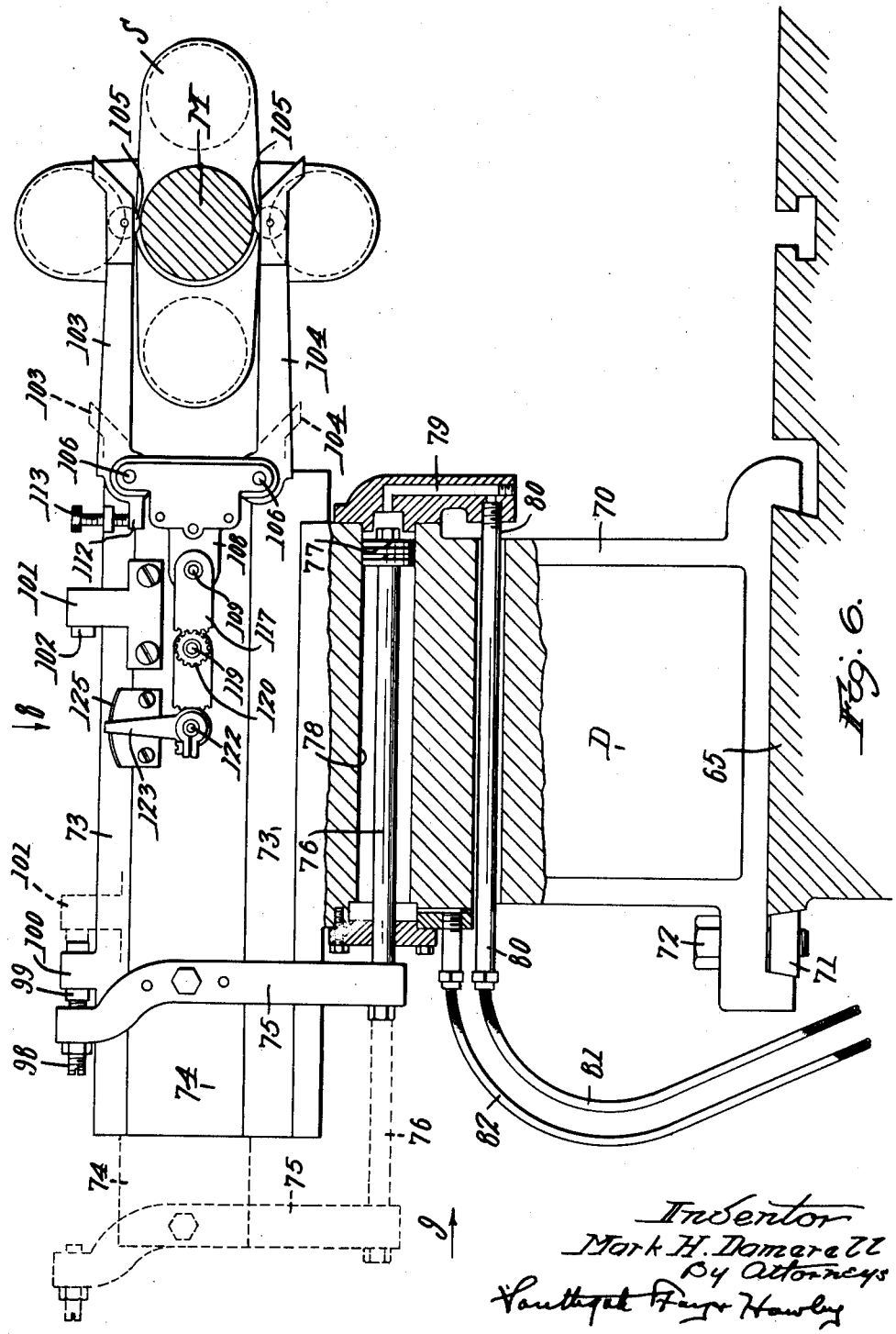

Dec. 5, 1933.    M. H. DAMERELL    1,938,216
INDICATING MACHINE
Filed June 1, 1931    14 Sheets-Sheet 5
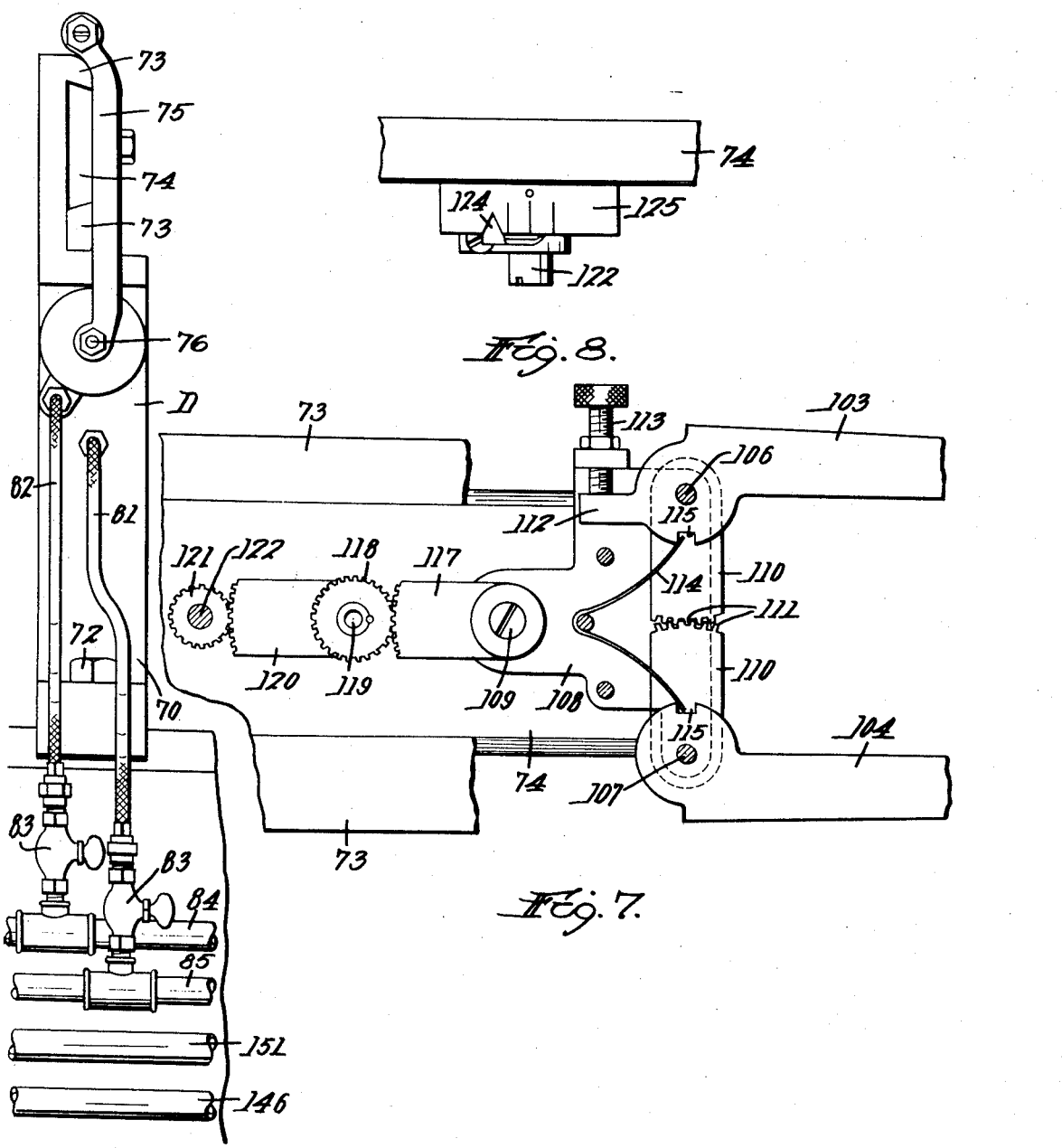

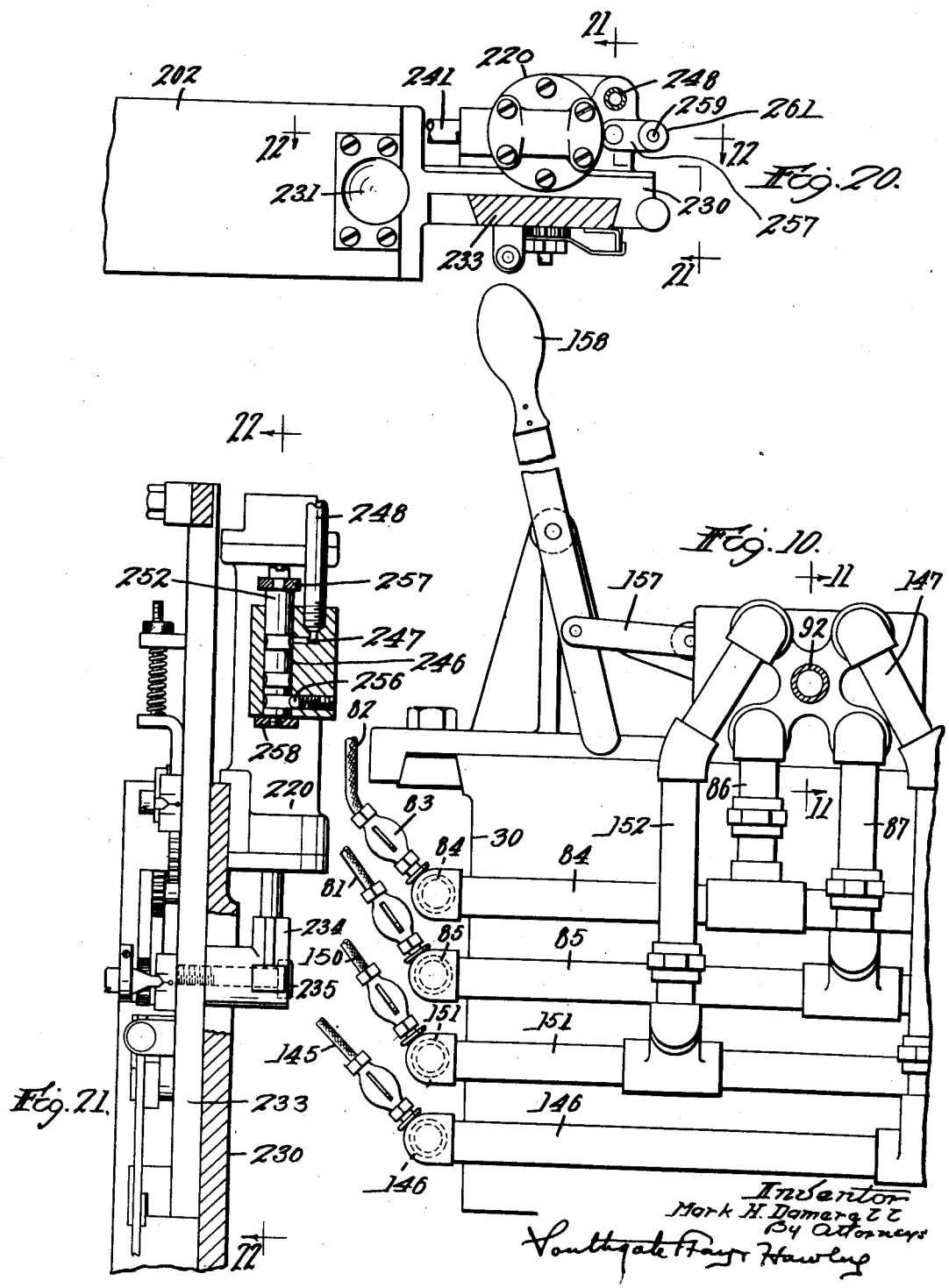

Dec. 5, 1933.  M. H. DAMERELL  1,938,216
INDICATING MACHINE
Filed June 1, 1931  14 Sheets-Sheet 8
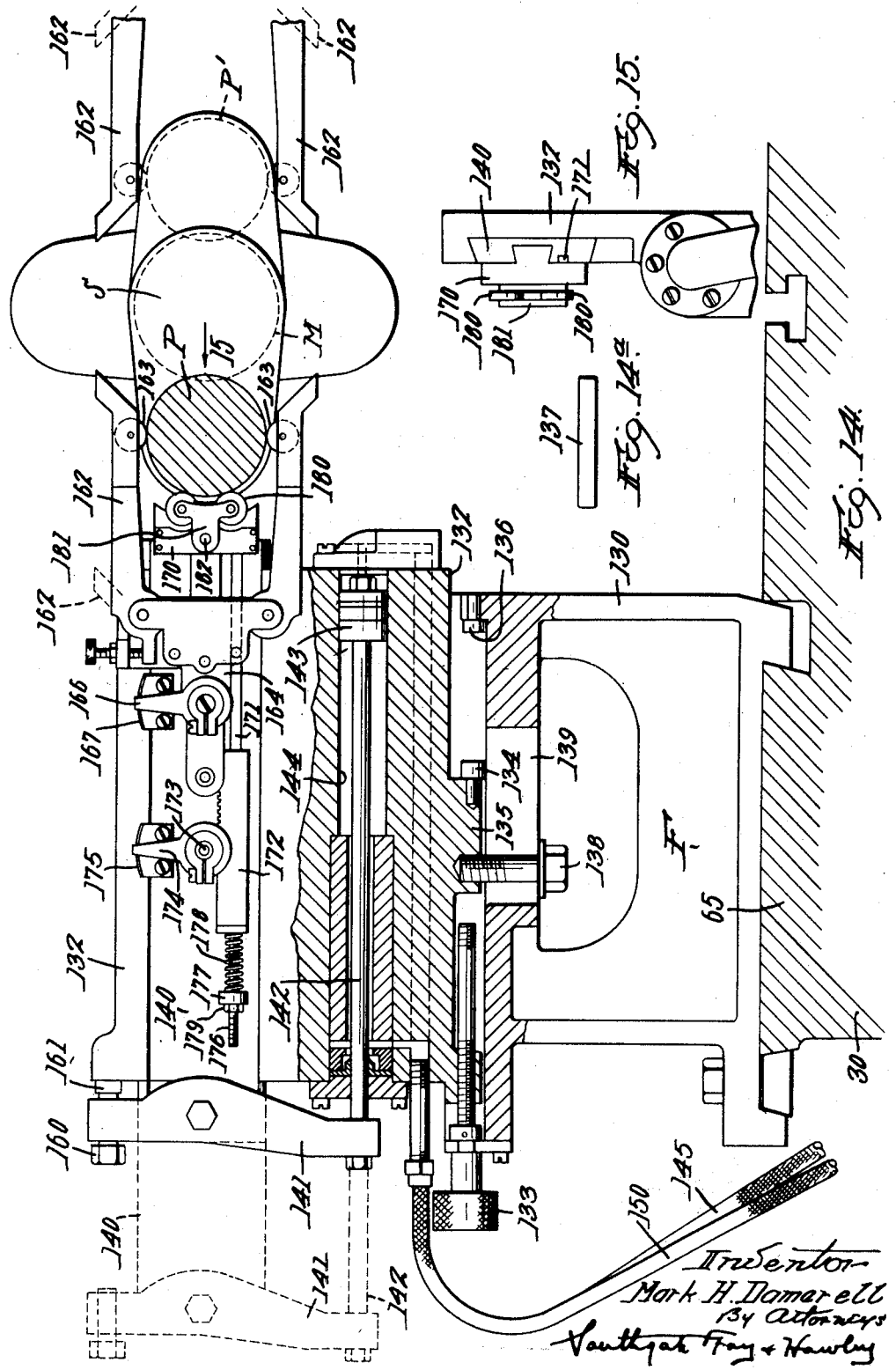

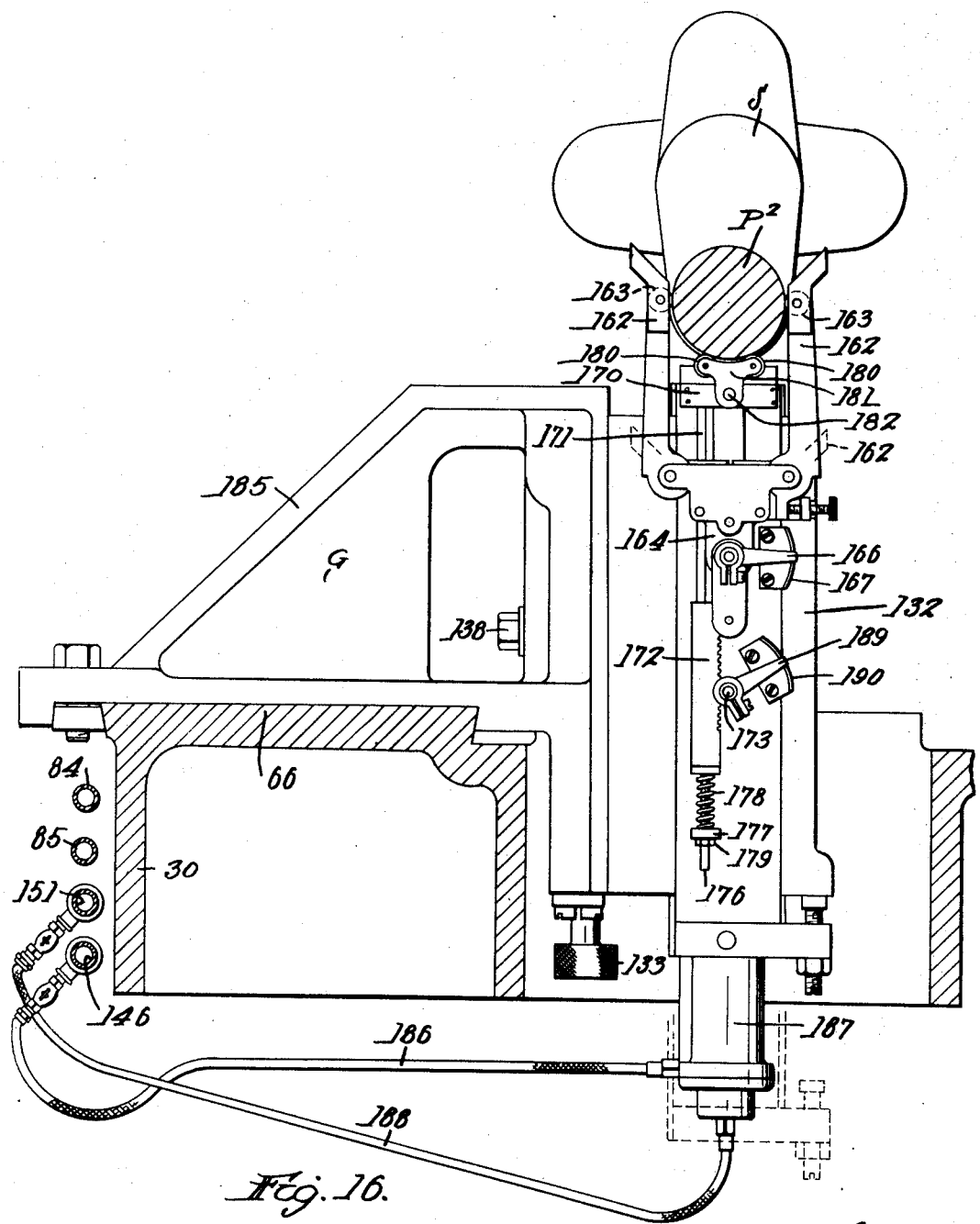

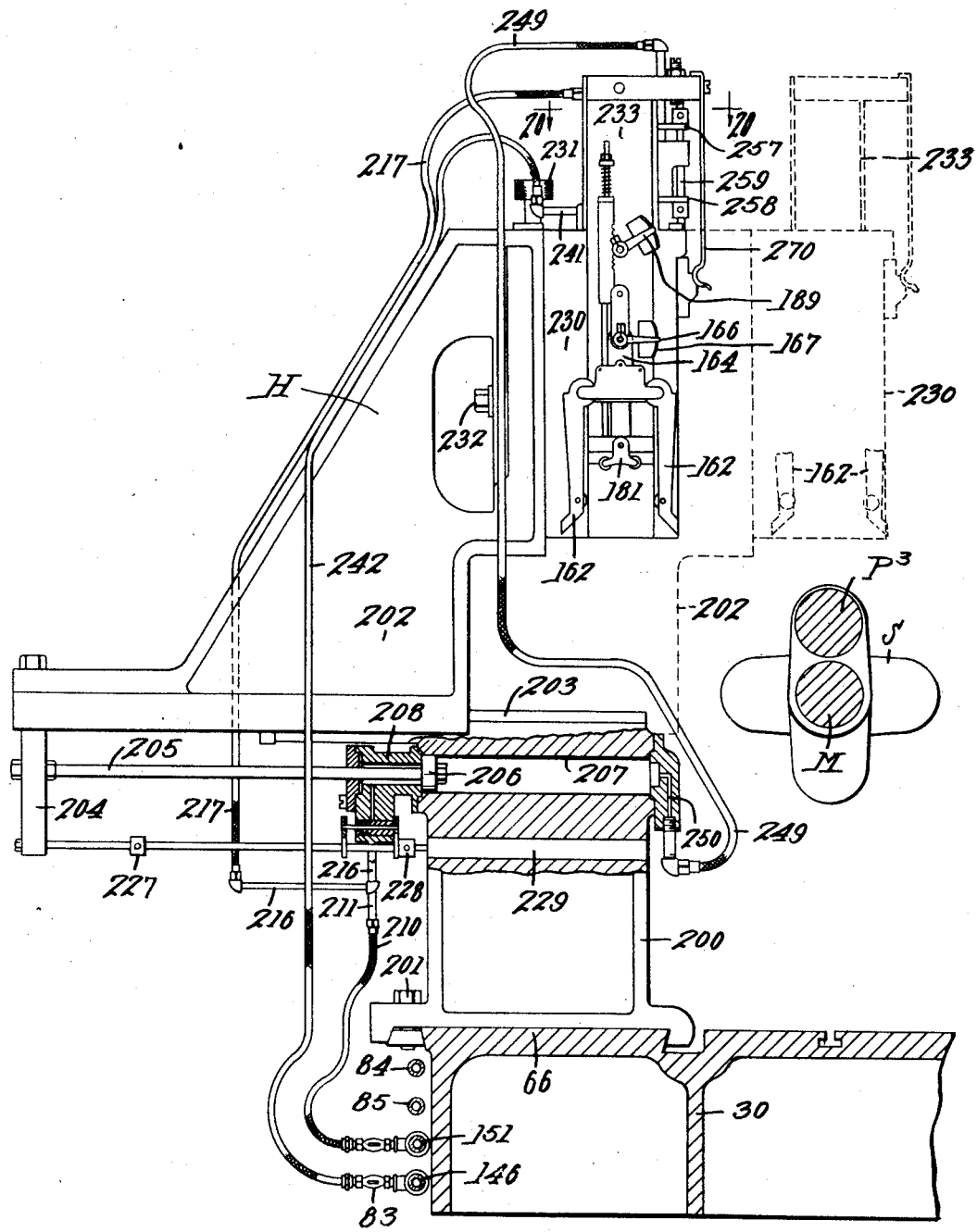

Dec. 5, 1933.  M. H. DAMERELL  1,938,216
INDICATING MACHINE
Filed June 1, 1931   14 Sheets-Sheet 11
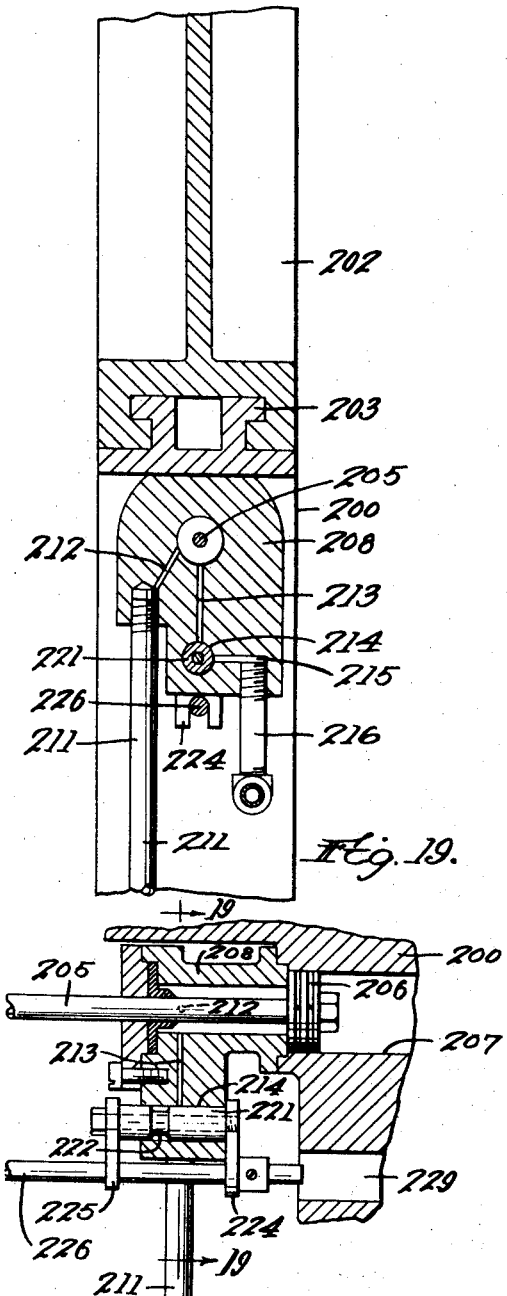
Fig. 19.
Fig. 18.
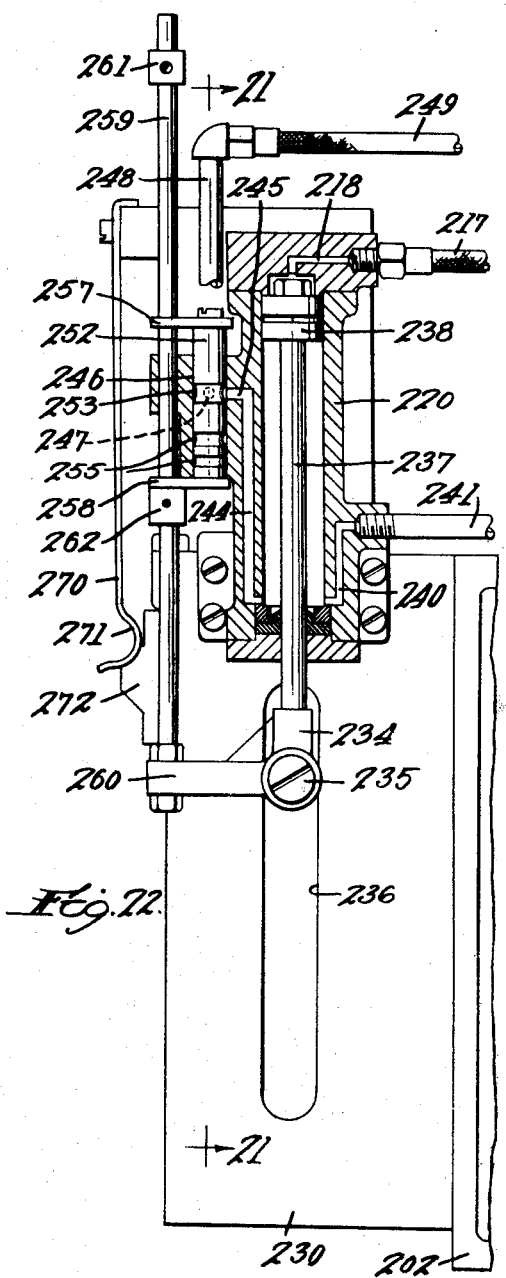
Fig. 22.
Inventor
Mark H. Damerell
By Attorneys
Southgate Fay & Hawley Dec. 5, 1933.  M. H. DAMERELL  1,938,216
INDICATING MACHINE
Filed June 1, 1931   14 Sheets-Sheet 13
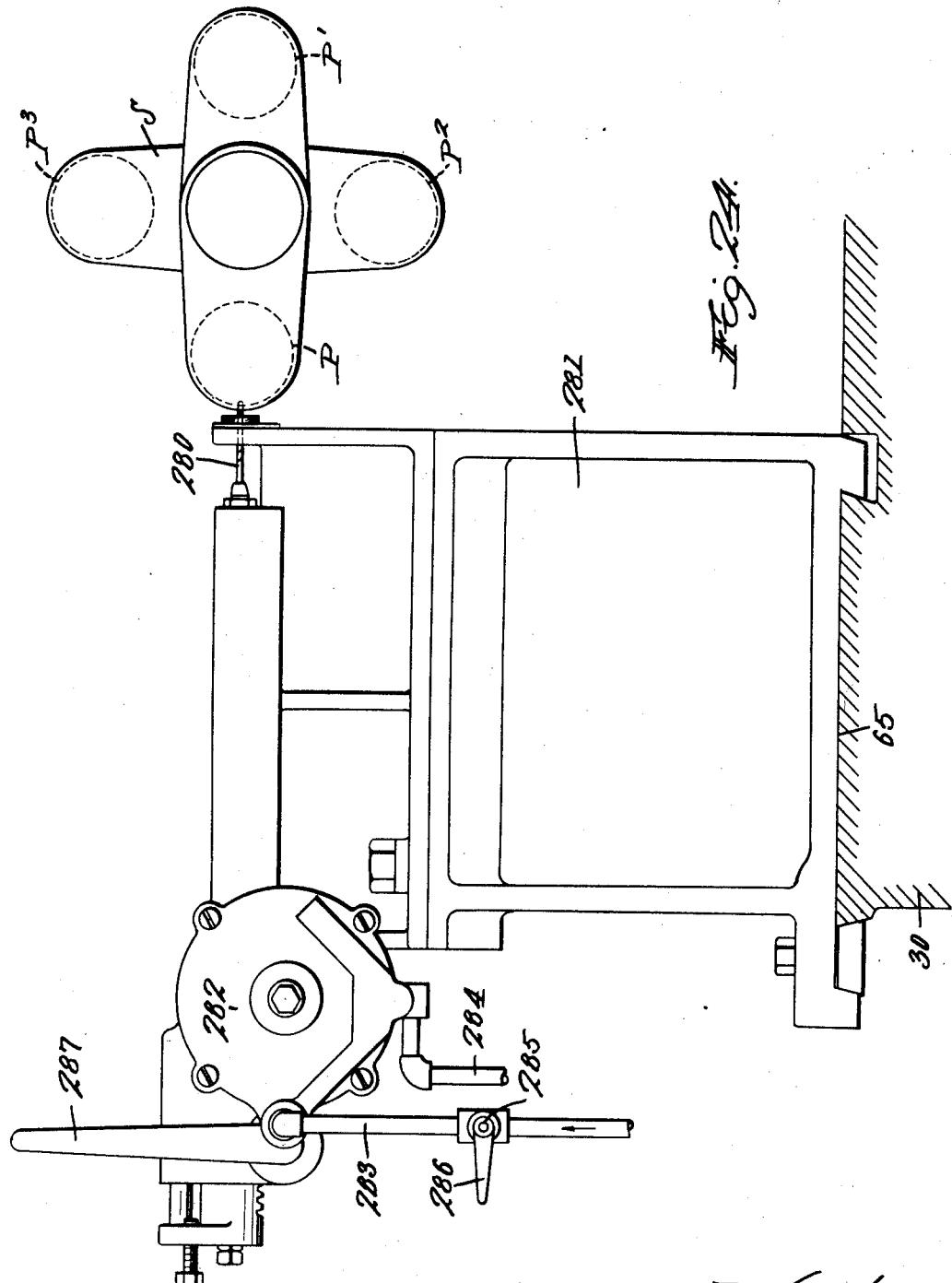
Inventor
Mark H. Damerell
By Attorneys
Southgate Fry & Hawley

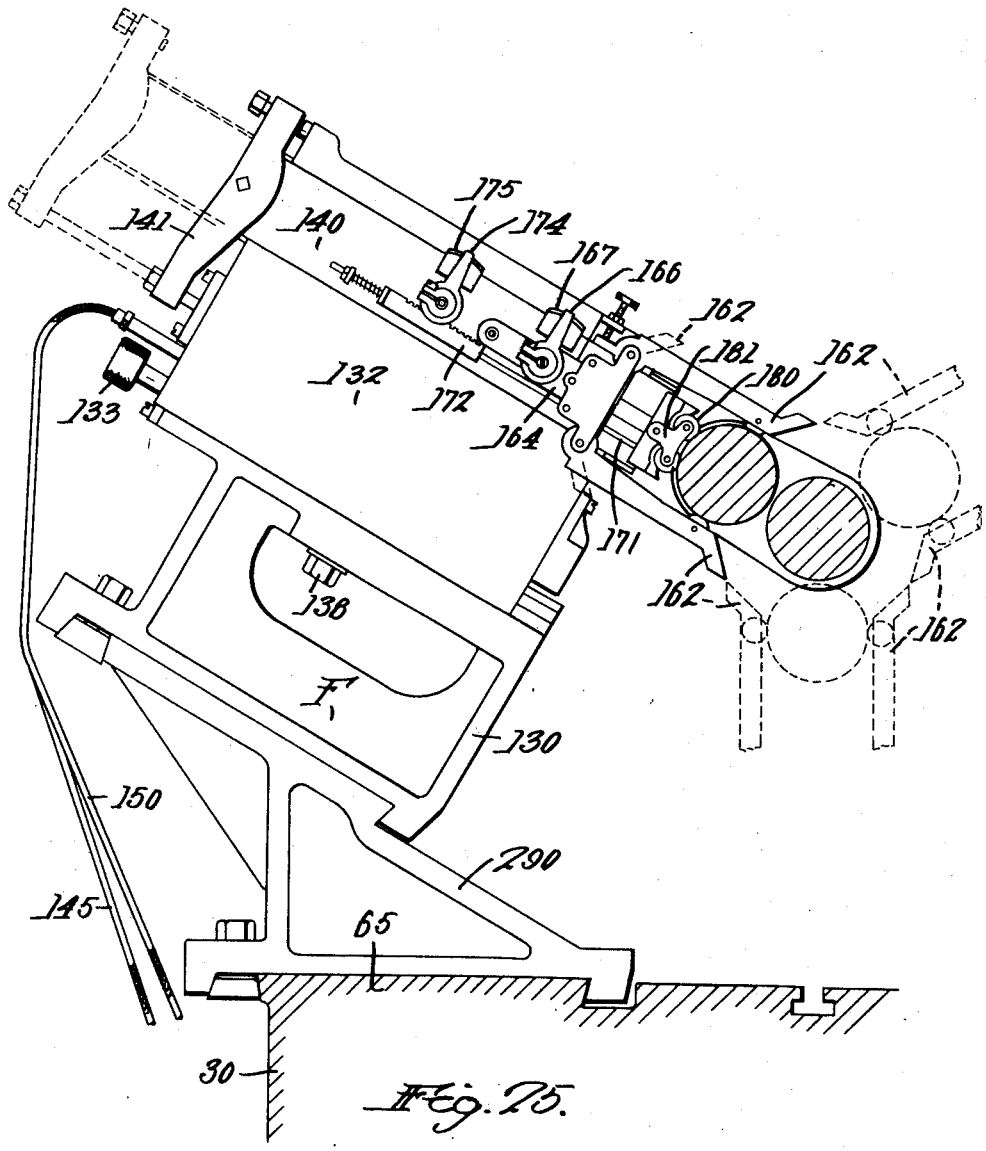

Patented Dec. 5, 1933

1,938,216

UNITED STATES PATENT OFFICE 1,938,216

INDICATING MACHINE

Mark H. Damerell, Worcester, Mass., assignor to Wyman-Gordon Company, Worcester, Mass., a corporation of Massachusetts Application June 1, 1931. Serial No. 541,423

9 Claims. (Cl. 33—181)

This invention relates to a machine for indicating the accuracy of multi-throw crank-shaft forgings.

It is the general object of the invention to provide an improved machine in which a multi-throw, multi-bearing crank-shaft forging may be indicated at a single operation to determine the eccentricity of all of the bearings and the throw and angular relation of all of the crank-pins.

A further object is to provide a machine in which the work may be conveniently inserted and removed without interference from the indicating devices and particularly from the devices for indicating the upper crank-pins.

I also provide means for marking the indicated forging in a predetermined position.

My invention further relates to arrangements and combinations of parts which will be hereinafter described and more particularly pointed out in the appended claims.

A preferred form of the invention is shown in the drawings, in which

Fig. 1 is a plan view of my improved machine;

Fig. 6 is a side elevation, partly in section, taken along the line 6—6 in Fig. 1 and showing an indicating device for one of the main shaft bearings;

Fig. 7 is an enlarged sectional side elevation of parts of the indicating device shown in Fig. 6;

Fig. 8 is a detail plan view, looking in the direction of the arrow 8 in Fig. 6;

Fig. 9 is a detail front elevation, looking in the direction of the arrow 9 in Fig. 6 and showing certain pneumatic connections;

Fig. 10 is an end elevation of certain control valve mechanism, looking in the direction of the arrow 10 in Fig. 1;

Fig. 14 is a side elevation, partly in section, of an indicating device for one of the front crank-pins, taken along the line 14—14 in Fig. 1;

Figure 23:
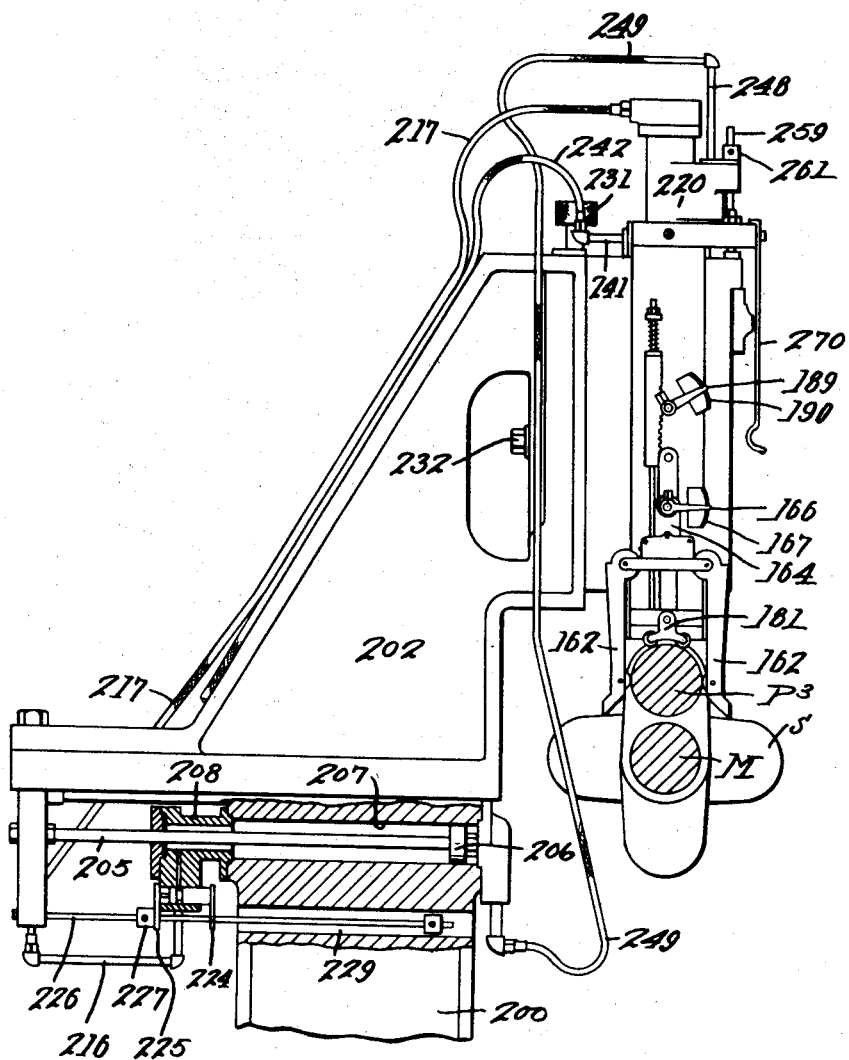

Fig. 14ª is a side elevation of the gauge-bar;

Fig. 15 is a detail rear elevation, looking in the direction of the arrow 15 in Fig. 14;

Fig. 16 is a side elevation, partly in section, of one of the indicating devices for the bottom crank-pins, taken along the line 16—16 in Fig. 1;

Fig. 17 is a side elevation, partly in section, of one of the indicating devices for the top crank-pins, taken along the line 17—17 in Fig. 1;

Fig. 18 is an enlarged sectional side elevation of certain operating mechanism shown in Fig. 17;

Fig. 19 is a detail sectional elevation, taken along the line 19—19 in Fig. 18;

Fig. 20 is a sectional plan view, taken along the line 20—20 in Fig. 17;

Fig. 21 is a detail sectional side elevation, taken along the line 21—21 in Figs. 20 and 22;

Fig. 22 is a detail sectional elevation, taken along the line 22—22 in Figs. 20 and 21;

Fig. 23 is a view similar to Fig. 17 but showing the parts in indicating position;

Fig. 24 is a side elevation of a device for drilling an index hole in a crank-shaft forging, looking in the direction of the arrow 24 in Fig. 1, and Fig. 25 is a side elevation of a crank-pin indicating device mounted for indicating a six-throw forging.

Referring to Fig. 1, I have shown my invention embodied in a machine which may be readily adapted for simultaneously indicating all of the crank-pins and main bearings of several different types of crank-shaft forgings to determine the alignment of the shaft bearings and the throw and angular relation of the crankpins. In the drawings, the machine is shown arranged to indicate the crank-pins and bearings of an eight-throw nine-bearing crank-shaft forging such as is widely used in the manufacture of automobile engines.

By changes in the arrangements of the indicating units, the machine may be quickly and easily adapted for other types of crank-shafts such as eight-throw, five-bearing shafts, four-throw shafts having three or five bearings, and by a slight modification the machine may be adapted for indicating six-throw shafts having seven or less bearings.

The crank-shaft forging S, for which the machine in the drawings is arranged, is indicated in plan view in Fig. 1 and in end elevation in Fig. 24, and comprises crank-pins displaced transversely from the main axis of the crank-shaft in four different directions.

*Work support and head-stock construction*

Figure 3:
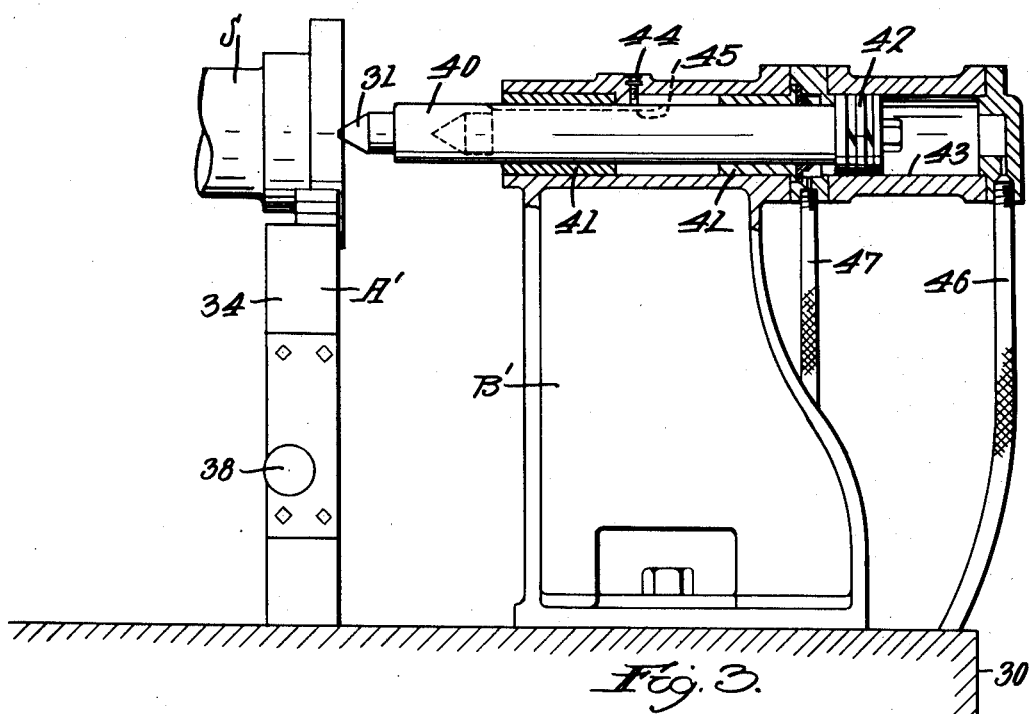
Fig. 3 is a sectional side elevation of one of the head-stocks, taken along the line 3—3 in Fig. 1.
Figure 2:
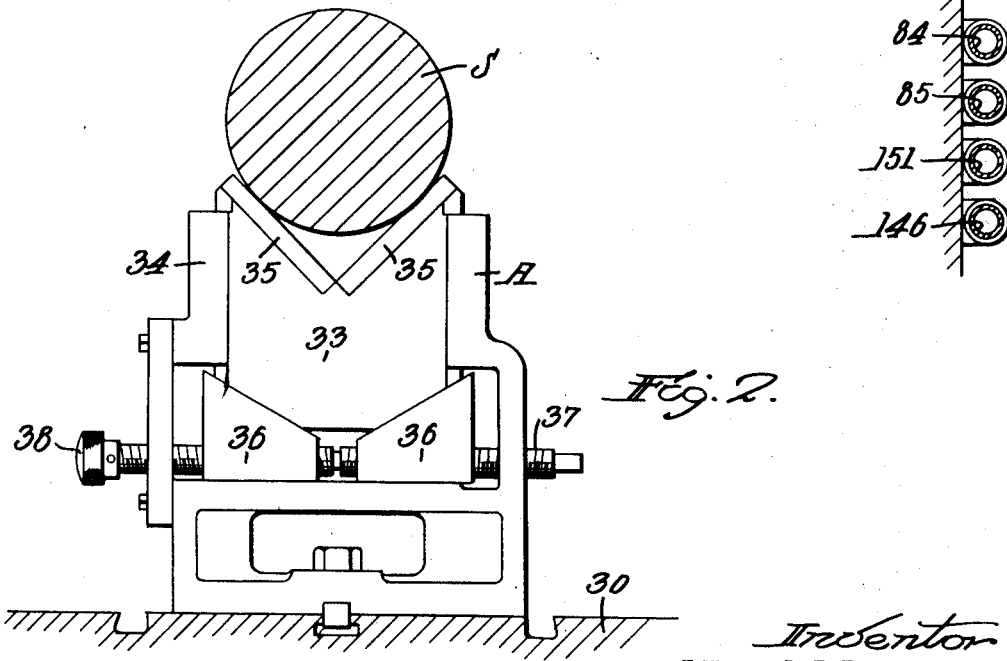
Fig. 2 is a detail sectional end elevation, taken along the line 2—2 in Fig. 1.

My improved machine comprises a base or bed 30 (Fig. 1) on which work supports A and A' are provided for positioning a crank-shaft forging approximately in line with centers 31 in headstocks B and B'. The supports A and A' are substantially duplicates and the construction thereof is shown in detail in Figs. 2 and 3.

Each support comprises a slide 33 mounted in vertical guideways in a frame 34 and having bearing plates 35 on which a portion of the forging S is supported. Opposed wedges 36 are slidable transversely in the frame 34 and may be simultaneously adjusted toward or away from each other by a right and left hand adjusting screw 37, operated manually by means of a knurled head 38. By adjusting the wedges 36 toward or away from each other, the slide 33 may be so raised or lowered so that the forging S supported thereby will be approximately aligned with the centers 31 but preferably slightly below the centers 31, so that the shaft will be lifted clear of the bearing plates 35 when supported by the centers 31.

Each center 31 is mounted in a plunger 40 (Fig. 3) slidable in bearings 41 in the head-stock B or B' and having a piston 42 mounted thereon and slidable in a cylinder 43. The plunger 40 is held from angular movement by a stud 44 projecting into a key-way 45 extending lengthwise of the plunger 40.

Air under pressure is conducted to the outer end of the cylinder 43 through a pipe 46 and to the inner end of the cylinder through a pipe 47. The pipes 46 and 47 are connected to upper and lower pipes 48 and 49 (Fig. 5) extending lengthwise of the machine at the lower rear corner of the bed 30. Air is supplied to the pipes 48 and 49 through a pipe 50 (Fig. 4) from a storage tank or other suitable source of supply of air under pressure.

The pipe 50 is connected to a port in the lower side of a valve block 51 (Fig. 4) and the pipes 48 and 49 are connected by branch pipes 52 and 53 to ports in the upper side of the valve block 51.

A piston valve 54 is mounted to slide in a cylindrical opening in the valve block and is connected by a link 55 to a three-armed lever 56 having a projecting portion 57 swinging between fixed stops 58 and 59. The lever 56 is connected by links 60 and 61 to foot levers or pedals 62 and 63, extending beneath the machine to the front side thereof, as indicated in Figs. 1 and 4.

Figures 4, 5:
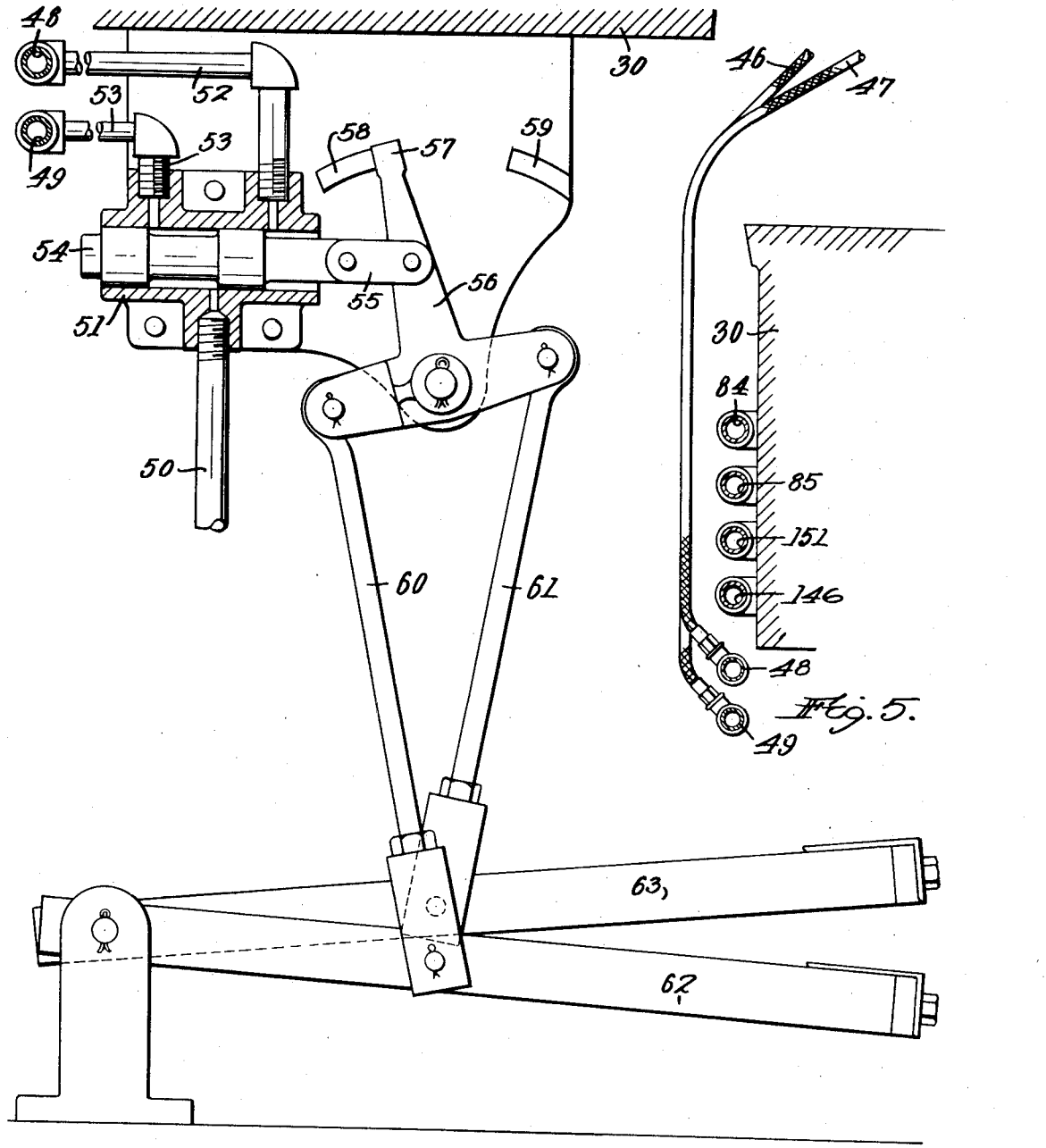
Fig. 4 is a side elevation, partly in section, of certain control mechanism, taken along the line 4—4 in Fig. 1.
Fig. 5 is a detail sectional elevation, taken along the line 5—5 in Fig. 1.

When the lever 62 is depressed, as shown in Fig. 4, the two-part piston 54 is moved to the left in Fig. 4 and connects the supply pipe 50 to the lower pipe 49 and thence through the flexible connection 46 to the outer portion of the cylinder 43 (Fig. 3), while at the same time the pipe 47 is connected through the pipes 48 and 52 to the atmosphere. Consequently the plungers 40 and the centers 31 are advanced toward the work. As the centers 31 enter the prepared center holes in the forging S, the forging is lifted slightly from the supports A and A'.

When the pedal 63 is depressed, the piston valve 54 is moved to the right in Fig. 4 to connect the pipe 47 through the pipes 48 and 52 to the air supply while the pipe 46 is connected to the atmosphere. The air pressure thereupon effects withdrawal of the centers 31 from the forging and the forging is deposited upon the supports A and A', from which it may be manually removed.

It will be understood that the head-stocks B and B' are substantially duplicates in construction and that they are both connected to the horizontal pipes 48 and 49 and are controlled for simultaneous operation by the single piston valve 54.

*Bearing indicating devices D*

The devices D for indicating the eccentricity of the main shaft bearings are substantially duplicates of each other and any desired number of these devices D may be assembled on the bed 30, which is provided with dove-tailed guideways 65 and 66 (Figs. 1 and 6), to which the various indicating devices may be firmly secured and by which they will be accurately aligned with each other.

One of the bearing indicating devices D is shown in detail in Figs. 6 to 9. Each bearing indicating device D comprises a base or frame member 70 (Fig. 6) adapted to be clamped to one of the guideways 65 or 66 by a clamping bar 71 and clamping bolts 72.

The upper part of the frame 70 is formed with transverse guideways 73 in which a slide 74 is mounted for horizontal movement. A cross-bar 75 is secured to one face of the slide 74 and extends downward into position for attachment to one end of the piston rod 76 (Fig. 6), connected to a piston 77 slidable in a cylinder 78 formed in the frame 70.

One end of the cylinder 78 is connected through a passage 79 and pipe 80 to a flexible tube 81 and the other end of the cylinder 78 is connected to a flexible tube 82.

Figure 11:
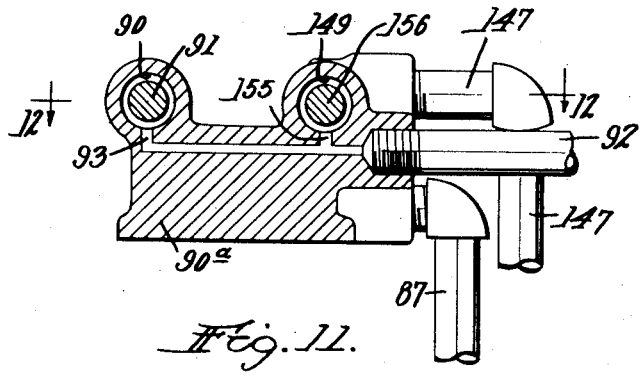
Fig. 11 is a detail sectional side elevation, taken along the line 11—11 in Fig. 10.

The pipes 81 and 82 (Fig. 9) are connected through shut-off valves 83 to upper and lower longitudinally extending air feed pipes 84 and 85. The pipes 84 and 85 extend along both the front and rear sides of the bed 30 and are connected at one end of the bed through branch pipes 86 and 87 (Fig. 10) to ports 88 and 89 (Fig. 12) in a cylindrical opening 90 in a valve block 90ª. A two-part piston valve 91 is mounted in the opening 90. An air supply pipe 92 (Fig. 11) is connected to an intermediate port 93 in the wall of the opening 90.

The valve 91 is connected by a link 95 (Fig. 1) to the lower end of a pivoted handle lever 96. When the handle is in the forward position indicated in Fig. 1, the piston 91 will be in rearward position and the inlet port 93 will be connected to the port 89 of the pipe 87, thus admitting air through the horizontal feed pipe 85 and the flexible pipe 81 (Fig. 6) to the rear end of the cylinder 78, which effects movement of the piston 77 forward or to the left in Fig. 6 and withdraws the indicating device to the inoperative position shown in dotted lines in Fig. 6.

When the handle 96 is pushed rearward, air is admitted through the pipe 82 to the front end of the cylinder 78 and the indicating device is advanced to the full line position indicated in Fig. 6. The single handle 96 controls the simultaneous forward or rearward movements of all of the bearing indicating devices D.

A stop screw 98 (Fig. 6) is threaded into the upper end of the cross-bar 75 and engages one end of a stud 99, mounted in a fixed abutment 100 on the upper guideway 73 of the frame 70. By adjustment of the screw 98, the extreme rearward or operative position of the slide 74 may be determined. A bracket 101 fixed on the slide 74 is provided with a stud 102 adapted to engage the rear end of the fixed stud 99 and limit the forward or withdrawing movement of the slide 74.

The indicating mechanism comprises a pair of indicating levers 103 and 104 (Figs. 6 and 7) each provided with a roll 105 adapted to engage the upper or lower surface of a main shaft bearing M. The levers 103 and 104 are pivoted at 106 and 107 (Fig. 7) to a plate 108, mounted on a stud 109 fixed in the slide 74. Equalizing arms 110 are secured to the levers 103 and 104 and are provided with intermeshing segmental gear teeth 111, by which any movement of either arm causes corresponding but reverse movement of the other arm.

The lever 103 has a projecting portion 112 engaging the end of an adjustable stop screw 113 mounted on an upward projection of the pivoted plate 108 and limiting approach movement of the arms. A double spring 114 extends into opposed notches 115 in the bearing portions of the levers 103 and 104 and acts to yieldingly press the indicating ends of the levers toward each other, such movement being limited by the stop screw 113.

A segment arm 117 is secured to the pivoted plate 108 and engages a pinion 118, pivoted at 119 on the slide 74 and having a second segment arm 120 secured thereto, which in turn engages a pinion 121, fixed on a stud 122 rotatable in a bearing in the slide 74.

An indicating arm 123 (Fig. 6) is adjustably clamped to the end of the stud 122 and is provided with an index point 124 (Fig. 8) movable over a graduated index plate 125.

With the construction described, the levers 103 and 104 may move toward or away from each other in accordance with the diameter of the bearing M to be indicated, but so long as these movements are equal in amount and opposite in direction, no movement of the plate 108 around its bearing 109 will take place.

If, however, the bearing M is eccentric, so that the levers 103 and 104 as a unit are displaced upward or downward, such displacement causes angular movement of the plate 108, which movement is transmitted through the multiplying connections described to the indicating arm 123 and is thereby clearly shown on an enlarged scale as the indicator point 124 moves over the index plate 125. Deflection of the point 124 in either direction from the zero mark shows that the indicated bearing M is out of alignment with the axis of the forging S in one direction or the other. Additional marks on the index plate 125 may be so spaced as to show the allowable variation for the indicated bearings.

From the preceding description, it will be evident that the slide 74 and the indicating mechanism mounted thereon is normally withdrawn to the dotted line position indicated in Fig. 6 during the removal or insertion of the work, but that the indicating device may be given a rearward indicating movement by manipulation of the handle 96, which will cause simultaneous movement of all other main bearing indicating devices D.

As many of these devices D are mounted on the bed 30 as are required to indicate the bearings of the particular type of forging to be tested. When an indicating device D is to be removed, it is merely necessary to close the shut-off valves 83 (Fig. 9) and uncouple the flexible connections 81 and 82.

Front crank-pin indicating devices F

In Figs. 14 and 15 I have shown one of the devices F for indicating the throw and relative angular position of a crank-pin located in the horizontal plane of the crank-shaft bearings and displaced toward the front of the machine.

These devices F are in many respects similar to the bearing indicating devices D, but contain certain additional features of construction. A frame member 130 (Fig. 14) is clamped to the guideway 65 of the bed 30, and an upper support 132 is mounted in guideways on the top of the frame member 130.

The upper support 132 is slidable on the frame member 130 and may be moved forward and rearward by an adjusting screw 133. An abutment or stop 134 is fixed in a depending projection 135 of the upper support 132, and a corresponding abutment or stop 136 is fixed in an upward projection of the frame member 130. A gauge bar 137 (Fig. 14ª) of a selected length may be inserted between the abutments 134 and 136 for quickly and easily adjusting the device to indicate crank-shaft forgings having crank-pins of different diameters or of different throws.

The upper support 132 may be secured in adjusted position on the frame member 130 by a clamping bolt 138, extending through a slot 139 in the top of the frame member 130. A slide 140 is mounted for forward and rearward movement in guideways in an upwardly extending portion of the upper support 132 and the slide 140 is provided with a cross-bar 141 connected by a piston rod 142 to a piston 143 slidable in a cylinder 144, all substantially as previously described.

Figure 12:
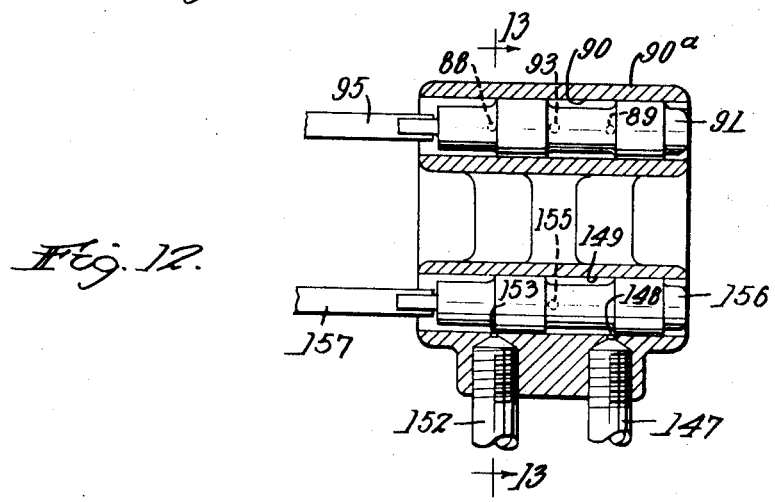
Fig. 12 is a detail sectional plan view, taken along the line 12—12 in Fig. 11.
Figure 13:
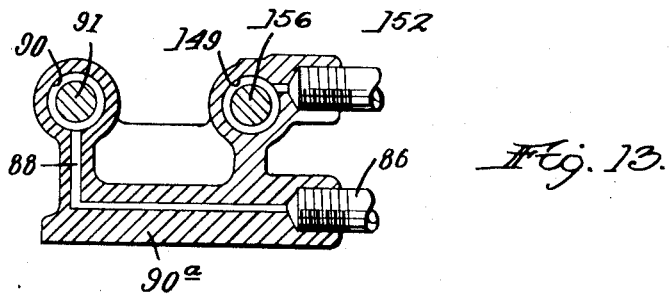
Fig. 13 is a detail sectional side elevation, taken along the line 13—13 in Fig. 12.

The rear end of the cylinder 144 is connected through a flexible pipe 145 to a horizontal pipe 146 (Fig. 10) which extends along both sides of the bed 30 and is connected at an intermediate point by a branch pipe 147 to a port 148 in a second cylindrical opening 149 in the valve block 110 90ª (Fig. 12).

The front end of the cylinder 144 is connected through a flexible pipe 150 (Fig. 14) to a horizontal pipe 151 (Fig. 10) also extending along both sides of the machine and connected by a branch pipe 152 to a second port 153 in the cylindrical opening 149.

The supply pipe 92 is connected to a port 155 (Figs. 11 and 12) in the cylindrical opening 149 and midway of its length. A two-part piston valve 156 is slidable in the opening 149 and is connected by a link 157 (Fig. 10) to a handle 158, corresponding to the handle 96 (Fig. 1) previously described.

When the handle is in the forward position indicated in Figs. 1 and 10, the valve 156 is in the rearward position indicated in Fig. 12, with the air supply port 155 connected to the port 148 so that air under pressure can flow through the pipes 147 and 146, (Fig. 10) and 145 (Fig. 14) to the rear end of the cylinder 144, thus moving the piston 143 forward and correspondingly moving the slide 140 to the inoperative withdrawn position indicated in dotted lines in Fig. 14. In this position of the valve 156, the port 153 is open to the atmosphere, thus venting the front end of the cylinder 144.

If the handle 158 is pushed rearward, the valve 156 is moved forward to connect the air supply port 155 through the port 153 and pipes 152 and 151 (Fig. 10) and 150 (Fig. 14) to the front end of the cylinder 144, moving the slide 140 rearward to its operative full line position, which position is determined by engagement of a stop screw 160 (Fig. 14) with a fixed abutment 161.

Indicating arms or levers 162 are provided with rolls 163 engaging the top and bottom surfaces of the crank-pin P (Fig. 14). The indicating arms 162 are mounted on a pivoted supporting plate 164, as previously described, and are connected through multiplying devices to move an index arm 166 over an index plate 167, thus indicating any deviation of the crank-pin P from its correct angular position. The details of this indicating mechanism are substantially similar to those already described for indicating the eccentricity of the main shaft bearings and the multiplying connections are also similar, with the exception that the second segmental multiplying arm is reversed in position and the index arm bearing is substantially aligned with the pivot of the supporting plate 164, as shown in plan view in Fig. 21.

A second slide 170 (Fig. 14) is mounted in guideways in the slide 140 previously described and is connected by a rod 171 to a rack bar 172 (Fig. 14) engaging a pinion pivoted at 173 on the slide 140 and supporting a multiplying arm 174 movable over an index plate 175.

A threaded stud 176 (Fig. 14) projects forward from the rack bar 172 through an opening in a lug or projection 177 on the slide 140. A spring 178 is mounted between the projection 177 and the forward end of the rack bar 172 and tends to move the rack bar 172 and slide 170 yieldingly rearward, the limit of such movement being determined by a nut 179 on the screw 176.

Contact rolls 180 (Fig. 14) are mounted in a swivel plate 181 pivoted at 182 to the slide 170, these rolls 180 engaging the periphery of the crank-pin P at its forward side. The position of the rolls when thus engaging the crank-pin is indicated by the arm 174 on the index plate 175, by reference to which the deviation from correct diameter or throw can be readily determined.

It will be noted that the crank-pin indicating device is normally in withdrawn or forward position during insertion or removal of the work, and that it is moved rearward to predetermined indicating position by rearward movement of the handle 158, which simultaneously controls all of the crank-pin indicating devices.

In an eight-throw crank, two of the devices F will be mounted at the front of the machine to indicate the forwardly projecting pins P and two additional devices F will be mounted at the rear of the machine to similarly indicate the rearwardly projecting crank-pins P′.

*Bottom crank-pin indicating devices G*

In Fig. 16 I have shown one of the devices G for indicating the downwardly projecting crank-pins P². This device G is substantially similar to the previously described devices F for indicating the front and rear crank-pins P and P′, with the exception that the device G is mounted in a vertical position on an angle bracket 185 (Fig. 16) which takes the place of the frame member 130 (Fig. 14) and which is clamped to the rear guideways 66 on the bed 30.

A flexible pipe 186 connects the upper end of the operating cylinder 187 to the horizontal pipe 146 previously described, and a flexible pipe 188 similarly connects the lower end of the cylinder 187 to the horizontal pipe 151. The index arm 189 and index plate 190 are positioned at an angle which renders them more convenient for reading by the operator.

With these exceptions, the construction and operation of the bottom pin indicating devices G are substantially identical with the front or rear pin indicating devices F.

It will be noted that the indicating devices G move downward to the dotted line position of Fig. 16 when inoperative, so that all parts are removed from the possibility of injury during removal or insertion of a crank-shaft forging S. Two of the devices G are shown in Fig. 1, cooperating with the two bottom crank-pins P² of the forging S.

*Top crank-pin indicating devices H*

In Figs. 17 to 23 I have shown the construction and operation of one of the devices H for indicating the top crank pins P³, two such devices being shown in Fig. 1. These devices are similar to the crank-pin indicating devices previously described but include some additional features, as it is necessary for these indicating devices to be removed horizontally as well as vertically from indicating position in order to permit insertion and removal of the work.

Each indicating device H comprises a bottom frame member 200 (Fig. 17) slidable on the rear guideway 66 of the bed 30 and secured in adjusted position thereon by a clamping bolt 201. An angle bracket 202 is mounted on dove-tailed guideways 203 formed on the top face of the frame member 200.

A cross bar 204 (Fig. 17) extends downward from the angle bracket 202 and is connected by a piston-pin 205 to a piston 206 in a cylinder 207 formed in the frame member 200.

The cylinder 207 has a forwardly extending portion 208 (Figs. 17 and 18) to which a flexible tube 210 (Fig. 17) is connected through a pipe 211 (Fig. 19) and a port 212. The lower end of the flexible tube 210 connects to the horizontal air feed pipe 151 previously described.

The cylinder portion 208 (Fig. 18) is connected through a cross passage 213 to a cylindrical opening 214, which in turn is connected through a port or cross passage 215 (Fig. 19) to a pipe 216. The pipe 216 is connected through a flexible tube 217 (Fig. 17) to a port 218 (Fig. 22) in the upper end of a cylinder 220.

A piston valve 221 (Figs. 18 and 19) in the cylinder 214 is provided with an annular groove 222 which forms a connecting passage from the cross passage 213 to the port 215 (Fig. 19) when the piston in its right hand position (as viewed in Figs. 17 and 18). The piston valve 221 closes the connection between the passage 213 and port 215 when it is in the left hand position in which it appears in said figures.

The piston valve 221 (Fig. 18) is provided with depending arms 224 and 225, the slotted ends of which embrace a reversing rod 226 secured to the cross bar 204 (Fig. 17) and movable forward and rearward therewith.

Collars 227 and 228 are secured on the rod 226 in adjusted positions and engage the arms 224 and 225 as the angle bracket or support 202 (Fig. 17) completes its sliding movement in one direction or the other. An opening 229 in the frame member 200 provides clearance for the rod 226 as it moves forward (or to the right in Fig. 17).

A supporting member 230 (Fig. 17) is mounted in vertical guideways in the upright face of the angle bracket 202 and may be adjusted vertically therein by an adjusting screw 231, and may be clamped in adjusted position therein by a clamping screw 232, all as previously described.

A slide 233 (Fig. 20) is mounted in guideways in the supporting member 230 and is provided with a bracket 234 (Fig. 21) secured to the slide by a stud 235 and projecting outward through a slot 236 (Fig. 22) in the support 230.

A piston rod 237 (Fig. 22) is connected at its lower end to the bracket 234 and at its upper end to a piston 238 in the cylinder 220 previously described, the cylinder 220 being mounted on the support 230, as clearly shown in Figs. 20 and 21.

The lower end of the cylinder 220 is connected through a passage 240 (Fig. 22) to a pipe 241 which in turn is connected through a flexible tube 242 (Fig. 17) to the horizontal air feed pipe 146 previously described.

A passage 244 (Fig. 22) leads upward from the lower end of the cylinder 220 to a port 245 in the side wall of a cylindrical opening 246. A port 247 (Fig. 21) is also located in the side wall of the cylindrical opening 246 and is horizontally aligned with the port 245. The port 245 is connected by a pipe 248 (Fig. 22) and a flexible tube 249 (Fig. 17) to a port 250 in the forward or right hand end of the cylinder 207 (as viewed in Fig. 17).

A piston valve 252 (Fig. 22) is vertically slidable in the cylindrical opening 246 and has an annular groove 253 adapted to connect the ports 245 and 247 when vertically aligned therewith. The piston valve 252 also has additional grooves 255 adapted to receive a spring-actuated plunger or ball 256 (Fig. 21) by which the piston valve 252 is held from accidental vertical displacement.

Arms 257 and 258 (Fig. 22) are secured to the upper and lower ends of the valve 252 and are slotted to embrace a rod 259, secured in an arm 260 projecting laterally from the bracket 234. The rod 259 thus moves vertically with the piston 238 and slide 233 and it is provided with collars 261 and 262 adapted to engage the arms 257 or 258 as it is shifted vertically.

When the piston 238 and slide 233 approach their upper limit of travel, the valve 252 will be engaged by the lower collar 262 and will be shifted to the raised position shown in Fig. 22, connecting the port 245 (Fig. 22) to the port 247 (Fig. 21) and thence connecting the right hand or outer end of the cylinder 207 (Fig. 17) through the passage 250, pipes 249 and 248 and passage 244 to the lower end of the cylinder 220 (Fig. 22) and thus through the pipes 241 and 242 to the air feed pipe 146, which is open to the exhaust when the indicating devices are being moved to operative position.

The operation of the pneumatic connections above described is as follows:—

Assuming that the parts are in the withdrawn or rearward position indicated in Fig. 17 and that the control handle 158 is moved rearward to admit air to the pipe 151, the following sequence of movements will take place:—

Air will first enter the left hand end of the cylinder 207 (as viewed in Fig. 17) through the cylinder portion 208, thus moving the piston 206 to the right and advancing the indicating mechanism to the dotted line position indicated in Fig. 17.

During this time, the cross passage 213 (Fig. 18) is closed by the piston valve 221, so that no air can pass upward through the pipes 216 and 217 (Fig. 17) to the upper cylinder 220. As the horizontal movement of the bracket 202 is substantially completed, the collar 227 (Fig. 17) will strike the arm 225 (Fig. 18) on the valve 221, pushing the same to the right so that its annular groove 222 connects the cross passage 213 to the port 215 and thus admits air through the pipes 216 and 217 to the upper end of the cylinder 220, moving the piston 238 downward and advancing the indicating mechanism to the operative position shown in Fig. 23.

During this time, the lower end of the cylinder 220 is connected to the exhaust through the pipes 241 and 242 and the outer end of the cylinder 207 is connected through the pipes 249 and 248 to the port 247 (Fig. 21) and thence through the annular groove 253 of the valve 252 to the port 245 (Fig. 22) and thence through the passage 244 to the lower end of the cylinder 220 which, as previously stated, is connected to the exhaust.

As the slide 233 completes its downward movement, the collar 261 (Fig. 22) engages the arm 257 on the valve 252 and moves the valve downward so that the annular groove 253 is out of alignment with the ports 245 and 247.

Through the connections described, the indicating mechanism has been moved first forward to a position above the crank-pin P³, as indicated in dotted lines in Fig. 17, and then downward to the indicating position shown in Fig. 23.

If now the control handle 158 is reversed, air will be admitted through the pipe 146 to the pipes 242 and 241 and through the passage 240 (Fig. 22) to the lower end of the cylinder 220, thus raising the indicating devices to their upper or withdrawn position.

During this upward movement, the passage 244 and port 245 are closed by the piston valve 252, which is in lowered position. As the slide 233 approaches its upward limit of travel, the collar 262 on the rod 259 engages the arm 258 at the lower end of the valve 252 and moves the valve upward, moving the annular groove 253 into alignment with the ports 245 and 247.

Air is then admitted to the pipes 248 (Fig. 1) and 249 (Fig. 17) and through the passage 250 to the outer or right hand end of the cylinder 207 (Fig. 23), thus forcing the piston 206 to the left and moving the bracket 202 and supported parts laterally to fully withdrawn position (Fig. 17).

A spring arm 270 (Figs. 17 and 22) is secured to the upper end of the slide 233, and the curved lower portion 271 of the spring arm rests against an abutment 272 on the support 230 when the slide 233 is in raised position.

When the slide is moved downward, the spring arm yields and passes over the abutment 272, but the spring is of sufficient strength so that the spring arm will hold the slide in raised position if the air pressure in the cylinder 220 below the piston 238 is accidentally released when the slide is in raised position.

The indicating devices on the slide 233 are identical in construction and method of operation with the indicating devices previously described in connection with the indicating device F for the forward crank-pins P. The multiplying connections are shown in side elevation in Fig. 21.

*Marking*

After a crank-shaft forging has bene fully indicated and has been found to be within the permissible limits of error in all respects, it is desirable to place an index mark on the forging which will preserve the exact setting of the forging at the time of indication.

For this purpose I provide the marking device shown in Fig. 24. This device comprises a drill 280 mounted on a frame 281 clamped in longitudinally adjusted position to the front guideway 65 on the bed 30. The drill may be operated in any convenient manner as by a high speed air turbine 282 connected by a pipe 283 to a suitable source of air under pressure and by a pipe 284 to the atmosphere or exhaust.

Admission of air to the turbine may be controlled by a valve 285 and hand lever 286 and the drill is moved rearward to engage the work by a hand lever 287. The details of the marking mechanism form no part of my present invention.

Six-throw shafts

In Fig. 25 I have indicated the manner in which my invention may be adapted for indicating six-throw shafts in which the crank-pins are 120° apart. The bottom pins may be indicated by using the bottom crank-pin indicating devices G (Fig. 16) exactly as previously described but for indicating the angularly disposed pins, I take certain front crank-pin indicating devices F (shown in detail in Fig. 14), and mount the frame members 130 thereof on special angle brackets 290 (Fig. 25) so that the slides 140 approach the work at an angle of 120° from the path of movement of the bottom crank-pin indicating devices.

Thus by the simple addition of the angle brackets 290 I am able to adapt my machine for six-throw as well as four or eight throw shafts.

Summary

By selecting the required number of indicating devices D, F, G or H and assembling them on the bed 30, I can indicate all of the crank-pins and all of the bearings on a shaft having four, six or eight cranks and any number of main bearings, all at a single and very simple operation.

All of the main shaft bearing indicating devices D are controlled by a single operating handle 96, and all of the crank-pin indicating devices F, G and H are controlled by a second operating handle 158, while the centering headstocks B and B' are both controlled by the foot pedals 62 and 63.

It should be particularly noted that the indicating devices are all withdrawn from operative position during the changing of the work, and that the devices H are withdrawn not only vertically but horizontally.

Having thus described my invention and the advantages thereof, I do not wish to be limited to the details herein disclosed, otherwise than as set forth in the claims, but what I claim is:—

1. In a crank-shaft indicating machine, an indicating device, a slide on which said device is mounted, a cylinder and piston connected to operate said slide, a support for said slide and cylinder, a frame member on which said support is slidably adjustable, means to limit operative movement of said slide in said support, and gauge means for positioning said support on said frame member to correspond to crank-shafts having different throws.

2. In a crank-shaft indicating machine, a support for a crank shaft by which said crank shaft is held in a definite predetermined position during indicating operation of said machine, indicating mechanism for a crank-pin which is positioned directly above the axis of the crankshaft, means to support said indicating mechanism in normal withdrawn position substantially above but at one side of the crank-shaft, and automatic means to advance said indicating mechanism to a position directly above said upper crank-pin and to thereafter lower said mechanism to engage and indicate said crank-pin, said automatic means effecting said two movements in predetermined relation.

3. In a crank shaft indicating machine, a support for a crank shaft by which said crank shaft is held in a definite predetermined position during an indicating operation of said machine, crank-pin indicating mechanism, a slide on which said mechanism is mounted, a support for said slide, and automatic means to give said support and slide successive movements in different directions and in predetermined time relation, thereby first transporting said indicating mechanism to operative position and thereafter advancing said mechanism to indicate the crank-pin.

4. In a crank shaft indicating machine, a support for a crank shaft by which said crank shaft is held in a definite predetermined position during an indicating operation of said machine, a crank-pin indicating mechanism, means to support said mechanism, and automatic means operating during a crank-pin indication to give said mechanism successive movements in directions substantially perpendicular to each other and in predetermined order and predetermined timed relation, thereby advancing said indicating mechanism from inoperative to operative position and thereafter advancing said indicating mechanism to engage said crank-pin.

5. In a crank shaft indicating machine, a support for a crank shaft by which said crank shaft is held in a definite predetermined position during an indicating operation of said machine, a crank-pin indicating mechanism, compound means to support said mechanism, automatic actuating mechanism for said supporting means, and control devices therefor effective to cause said actuating mechanism to give said indicating mechanism an advance movement from inoperative to operative position and to thereafter give said indicating mechanism an indicating movement toward the crank-pin, said two movements of said indicating mechanism being in directions substantially perpendicular to each other, and the second movement beginning automatically when the first movement is completed.

6. In a crank shaft indicating machine, a support for a crank shaft by which said crank shaft is held in a definite predetermined position during an indicating operation of said machine, a crank-pin indicating mechanism, a slide on which said mechanism is mounted, a support for said slide, means mounting and guiding said support for movement from inoperative to operative position and in a direction transverse to the line of movement of said slide, a pneumatic cylinder and piston for actuating said support, a second pneumatic cylinder and piston for actuating said slide, a single manual control device for said indicating mechanism, and supplemental automatic control means effective to cause said cylinders and pistons to operate successively and in predetermined order after movement of said manual control device.

7. In a crank shaft indicating machine, a support for a crank shaft by which said crank shaft is held in a definite predetermined position during an indicating operation of said machine, crank-pin indicating mechanism, a slide on which said mechanism is mounted, a support for said slide, means mounting and guiding said support for movement from inoperative to operative position and in a direction transverse to the line of movement of said slide, a pneumatic cylinder and piston for actuating said support, a second pneumatic cylinder and piston for actuating said slide, a single manual control device for said indicating mechanism, and relay valve mechanism determining the order in which said cylinders and pistons shall become operative after movement of said manual control device.

8. In a crank shaft indicating machine, a support for a crank shaft by which said crank shaft is held in a definite predetermined position during an indicating operation of said machine, crank-pin indicating mechanism, a slide on which said mechanism is mounted, a support for said slide, means mounting and guiding said support for movement from inoperative to operative position and in a direction transverse to the line of movement of said slide, a pneumatic actuating mechanism for said support, a second pneumatic actuating mechanism for said slide, a single manual control device for said indicating mechanism, and supplementary automatic control means effective to cause said pneumatic mechanisms to become operative successively and in predetermined order after movement of said manual control device, thereby advancing the indicating mechanism to indicating position.

9. In a crank shaft indicating machine, a support for a crank shaft by which said crank shaft is held in a definite predetermined position during an indicating operation of said machine, crank-pin indicating mechanism, a slide on which said mechanism is mounted, a support for said slide, means mounting and guiding said support for movement from inoperative to operative position and in a direction transverse to the line of movement of said slide, a pneumatic actuating mechanism for said support, a second pneumatic actuating mechanism for said slide, a single manual control device for said indicating mechanism, and supplementary automatic control means effective to cause said pneumatic mechanisms to become operative successively and in predetermined order after movement of said manual control device, thereby advancing the indicating mechanism to indicating position, said supplementary control means also causing said pneumatic mechanisms to become operative successively but in reverse order to withdraw the indicating mechanism from indicating position and to return said mechanism to inoperative position when the manual control device is moved in the opposite direction.

MARK H. DAMERELL.